United States Patent [19]

Pereny

[11] 4,117,381
[45] Sep. 26, 1978

[54] VIBRATOR
[75] Inventor: Franklin C. Pereny, Lancaster, N.Y.
[73] Assignee: Stanley Truxell, Lancaster, N.Y. ; a part interest
[21] Appl. No.: 827,314
[22] Filed: Aug. 24, 1977
[51] Int. Cl.² ............................................. H02K 33/02
[52] U.S. Cl. ..................................... 318/120; 310/77; 310/79
[58] Field of Search ....................... 310/17, 15, 19, 28, 310/29, 32, 33, 27; 318/120

[56] References Cited
U.S. PATENT DOCUMENTS

| 2,271,382 | 1/1942 | Worthington | 318/120 UX |
| 2,539,391 | 1/1951 | Alvord | 310/29 |
| 2,610,995 | 9/1952 | Orsatti et al. | 310/29 |
| 3,170,078 | 2/1965 | Kuschel | 310/29 |
| 3,733,500 | 5/1973 | Mushrush | 310/29 X |

Primary Examiner—Donovan F. Duggan
Attorney, Agent, or Firm—Clarence A. O'Brien; Harvey B. Jacobson

[57] ABSTRACT

A base yieldably supporting a frame, on which an electromagnetic assembly is mounted, is fixedly secured to a more massive body to which an armature is elastically connected by coupling springs. Limit switches control initiation and termination of a timer controlled cycle during which the electromagnetic assembly is energized to cause advancement of the armature under magnetic attraction followed in sequence by acceleration of the massive body and the frame under the urge of the elastically deformed springs.

6 Claims, 8 Drawing Figures

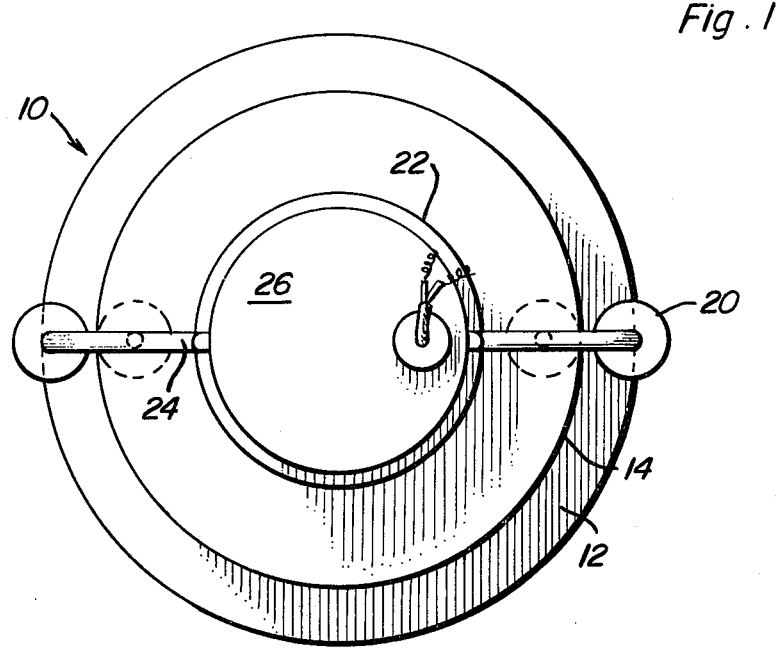
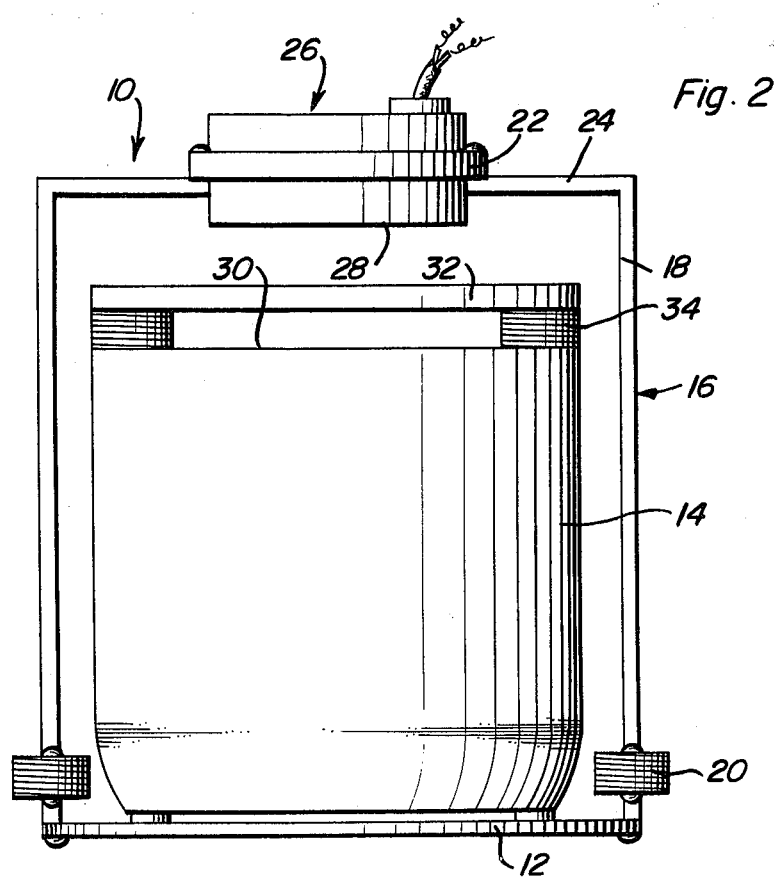

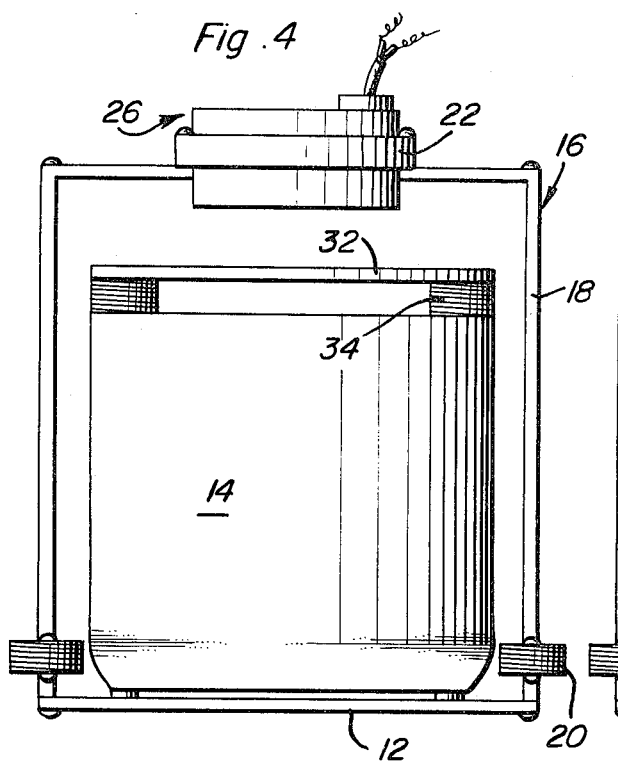
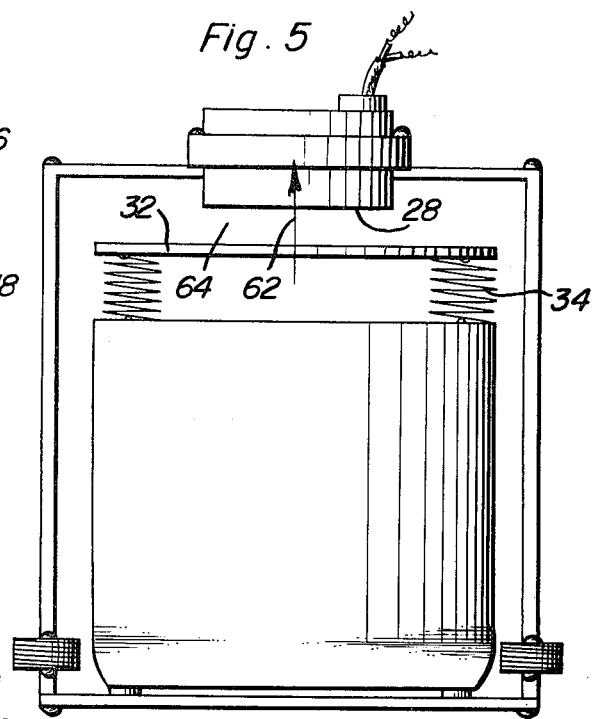
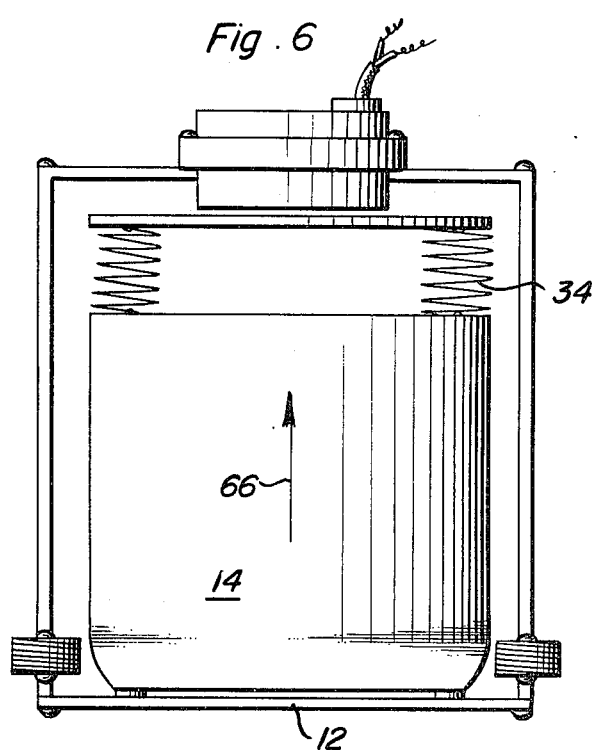
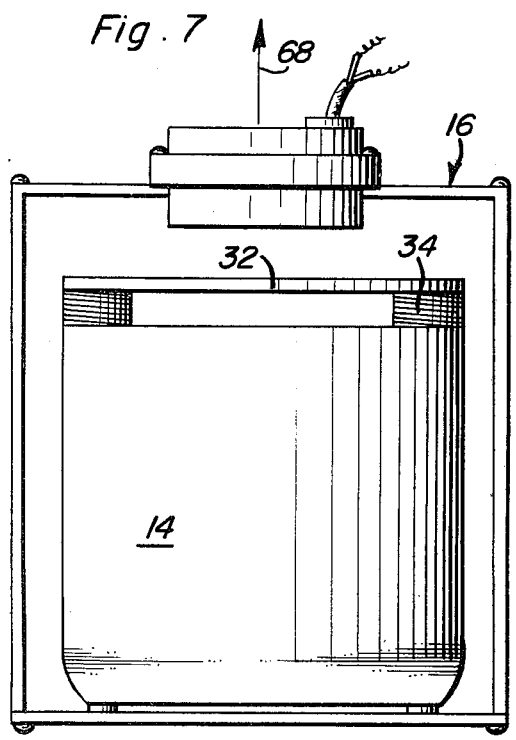

VIBRATOR

BACKGROUND OF THE INVENTION

1. Field of the Invention

This invention relates to controlled vibration of a massive body relative to a frame supporting an electromagnetic assembly.

2. Description of the Prior Art

Electromagnetic vibrators and the like to which the present invention relates are already known as disclosed in the following prior U.S. patents of which applicant is aware:

U.S. Pat. No. 2,276,510 — Mar. 17, 1942 — Newton
U.S. Pat. No. 2,434,337 — Jan. 13, 1948 — Soderstrom
U.S. Pat. No. 2,886,976 — May 19, 1959 — Dean
U.S. Pat. No. 3,088,062 — Apr. 30, 1963 — Hudimac
U.S. Pat. No. 3,116,428 — Dec. 31, 1963 — Blodgett et al.
U.S. Pat. No. 3,182,517 — May 11, 1965 — Dean
U.S. Pat. No. 3,345,525 — Oct. 3, 1967 — MacBlane
U.S. Pat. No. 3,733,500 — May 15, 1973 — Mushrush
U.S. Pat. No. 3,775,625 — Nov. 27, 1973 — Brosch et al.

SUMMARY OF THE INVENTION

In accordance with the present invention, a massive body is vibrated relative to a frame by cyclic elastic deformation of springs connecting the body to an armature and the frame, inducing sequential acceleration of the body and the frame in response to initial displacement of the armature relative to the frame under magnetic attraction. A timer controls the duration of the magnetic field producing the magnetic attraction during a cycle controlled by opening and closing of limit switches.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of a vibrator constructed in accordance with the present invention.

FIG. 2 is a front elevation view of the vibrator shown in FIG. 1.

FIGS. 4-7 are front elevation views of the vibrator in different phases of operation during an operational cycle.

DESCRIPTION OF THE PREFERRED EMBODIMENTS

Figure 3:
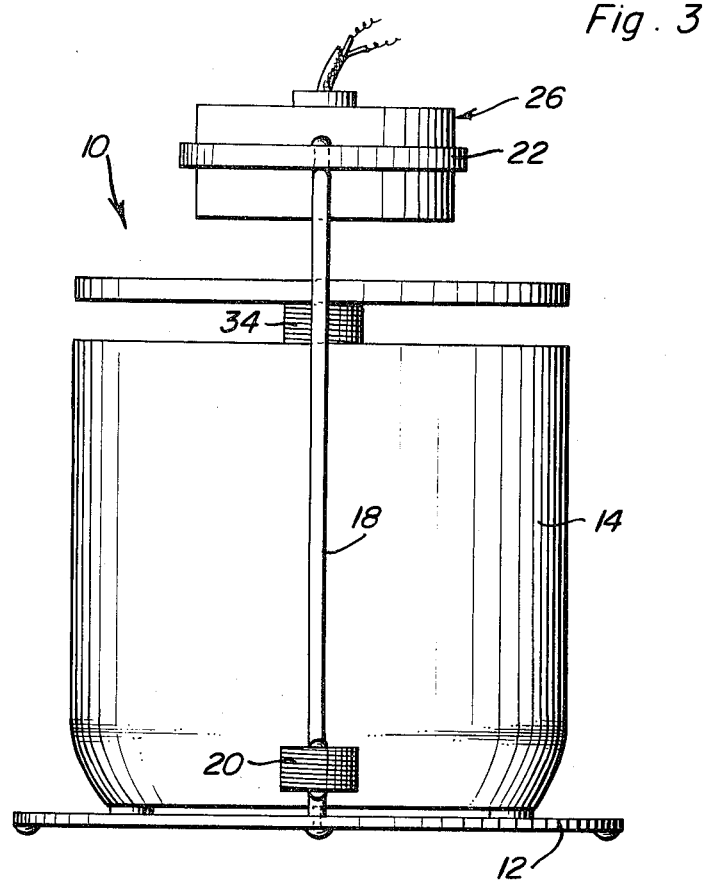
FIG. 3 is a side elevation view of the vibrator shown in FIGS. 1 and 2.

Referring now to the drawings in detail, FIGS. 1, 2 and 3 show the electromagnetic vibrator generally referred to by reference numeral 10 in a static and deenergized condition. The vibrator includes a base plate 12 to which a relatively massive body 14 is fixedly secured. A frame 16 including a pair of parallel spaced rods 18 is yieldably supported on the base plate in straddling relation to the body 14 by a pair of compression springs 20. The frame rods 18 are interconnected above the body 14 by an annular support ring 22 from which a pair of radial connecting bars 24 extend to the rods 18. The support ring 22 mounts an electromagnetic assembly 26. The electromagnetic assembly presents a magnetic flux emitting pole face 28 spaced from the top 30 of the body 14 by a distance that is varied to a limited extent in response to elastic deformation of the springs 20 from the static condition shown in FIGS. 1, 2 and 3.

Associated with the electromagnetic assembly 26 is an armature disc 32 made of a ferromagnetic material. A pair of tension coupling springs 34 yieldably connect the armature disc to the top 30 of the body. Energization of the electromagnetic assembly will therefore cause upward displacement of the armature disc toward the face 28 against the bias of springs 34. The frame 16 and body 14 are preferably made of a non-magnetic material so as to have little effect on the magnetic field generated by the assembly 26 in the air gap 64 between the pole face 28 and the armature disc 32.

Figure 8:
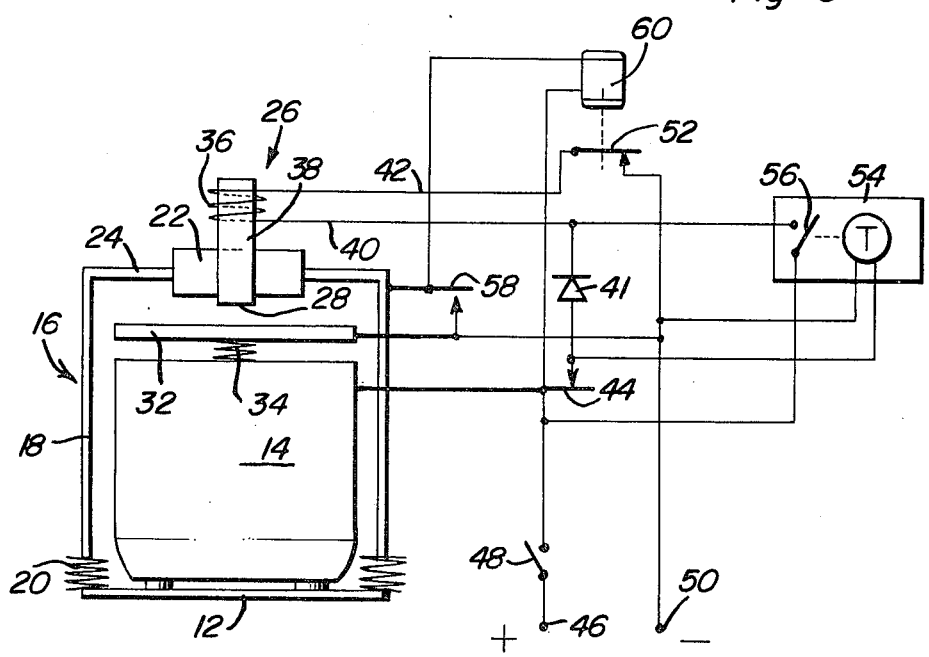
FIG. 8 is a circuit diagram showing the control system associated with the vibrator.

As diagrammatically shown in FIG. 8, the electromagnetic assembly 26 includes a winding 36 mounted about a core 38 through which magnetic flux is emitted from pole face 28 to attract the armature disc 32 when the winding is energized by a DC current applied through conductors 40 and 42. Conductor 40 is connected through a diode 41 and normally closed limit switch 44 to the positive terminal 46 of a DC voltage source upon closing of a power switch 48. The conductor 42 is connected to the negative terminal 50 of the voltage source through a normally closed relay switch 52. Closing of the power switch 48 also connects the voltage source through limit switch 44 to a timer 54 to initiate a timing cycle upon closing of timer switch 56 connecting the positive terminal 46 to conductor 40, in by-pass relation to limit switch 44 which is opened in response to displacement of the armature disc 32 from its position of rest shown in FIG. 8. When the armature disc reaches a limit position approaching pole face 28, limit switch 58 is closed to energize relay coil 60 and open relay switch 52. Upon opening of the relay switch, the electromagnetic winding 36 is deenergized to establish a limit for each timed operational cycle determined by adjustment of the timer 54.

At the beginning of each cycle, the vibrator is in the rest position shown in FIG. 4. Energization of the electromagnetic winding causes advancement of armature disc 32 toward pole face 28 as shown by arrow 62 in FIG. 5 to reduce the air gap 64 causing elastic elongation of springs 34. This is followed by advancement of the massive body 14 under the urge of springs 34. The accelerating force applied to body 14 is transmitted through springs 20 to the less massive frame 16 to reduce the rate at which the air gap 64 is decreased as the armature disc continues to advance toward pole face 28 under magnetic attraction. At an optimum instant in the cycle, the timer switch 56 opens to deenergize the electromagnetic winding 36 as the massive body 14 continues movement under the momentum generated during the preceding phase of operation as shown by arrow 66 in FIG. 6. As the armature disc 32 is restored to its initial position relative to body 14 by springs 34, the frame is advanced upwardly as shown by arrow 68 in FIG. 7 under the force transmitted thereto by the massive body through springs 20. When the armature disc returns to its initial position relative to the body 14, limit switch 44 closes to initiate another timer controlled cycle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An electromagnetic device comprising a base, a movable frame yieldably supported on the base, a relatively massive body fixedly secured to the base, magnetic field generating means fixedly mounted on the frame in spaced relation to the body, an armature displaceable under magnetic attraction toward said field generating means, elastically deformable means connecting the armature to the body for yieldably holding the armature spaced from said field generating means by a variable air gap within which a magnetic field is established, a source of electrical energy and control means connecting said source to the field generating means for cyclically establishing said magnetic field to exert said magnetic attraction on the armature.

2. The combination of claim 1, wherein said control means includes limit switch means engageable in a rest position of the armature relative to the body for initiating a cycle during which the magnetic field established, and timing means for selecting the duration of the magnetic field during the cycle.

3. The combination of claim 2, wherein said elastically deformable means comprises tension springs expanded in response to displacement of the armature from said rest position relative to the body.

4. The combination of claim 1, wherein said elastically deformable means comprises tension springs expanded in response to displacement of the armature from a rest position relative to the body.

5. In combination with a relatively massive body and a less massive frame, means for vibrating the body relative to the frame, comprising a base fixedly secured to the body, spring means yieldably supporting the frame on the base, electromagnetic means fixedly mounted on the frame for establishing a magnetic field, an armature displaceable in said magnetic field in response to energization of the electromagnetic means, and elastically deformable coupling means connecting the armature to the body for acceleration relative to the frame in response to displacement of the armature by the magnetic field.

6. The combination of claim 5, including timer controlled means for cyclically energizing and deenergizing the electromagnetic means.

* * * * *